US012561233B2

(12) United States Patent　　(10) Patent No.:　US 12,561,233 B2

Puzhakkal Pulikkal　　(45) Date of Patent:　Feb. 24, 2026

(54) SYSTEM AND METHOD FOR SCRIPT-LESS AUTOMATION FOR RTP TESTING OR ANY API TESTING

(71) Applicant: UST Global Private Limited, Marylebone (GB)

(72) Inventor: Shajahan Puzhakkal Pulikkal, Aspley (GB)

(73) Assignee: UST GLOBAL PRIVATE LIMITED, Marylebone (GB)

( * ) Notice: Subject to any disclaimer, the term of this patent is extended or adjusted under 35 U.S.C. 154(b) by 185 days.

(21) Appl. No.: 18/563,563

(22) PCT Filed: Nov. 17, 2021

(86) PCT No.: PCT/IB2021/060648

§ 371 (c)(1),
(2) Date: Nov. 22, 2023

(87) PCT Pub. No.: WO2022/248929

PCT Pub. Date: Dec. 1, 2022

(65) Prior Publication Data

US 2024/0241818 A1　　Jul. 18, 2024

(30) Foreign Application Priority Data

May 24, 2021　(IN) ............................. 202111022970

(51) Int. Cl.
G06F 11/3668　　(2025.01)

(52) U.S. Cl.
CPC ...... G06F 11/3684 (2013.01); G06F 11/3688 (2013.01); G06F 11/3692 (2013.01)

(58) Field of Classification Search
None
See application file for complete search history.

(56) References Cited

U.S. PATENT DOCUMENTS 10,437,712 B1 * 10/2019　Tyler ................... G06F 11/3684
11,341,030 B2 * 5/2022　Christen ............. G06F 11/3688
(Continued)

OTHER PUBLICATIONS

International Search Report for International Application No. PCT/IB2021/060648; International Filing Date—Nov. 17, 2021; mailed Feb. 23, 2022; 3 pages.

(Continued)

*Primary Examiner* — Philip Wang
*Assistant Examiner* — Rongfa P Wang
(74) *Attorney, Agent, or Firm* — CANTOR COLBURN LLP

(57) ABSTRACT

The invention discloses a method for script-less automation testing of any API's based product including RTP's. The method utilizes a template-based approach for testing the API's based products. Further, the method automates the testing by eliminating behaviour capturing of the application under test. Furthermore, the method comprises of 'user interface' module and a 'central automation solution' module. The user interface module is utilized to trigger test execution for any API/RTP scenarios, configure inputs for test data & validation rules, and a test result dashboard to view the test execution results and test artifacts. The 'central test automation solution' module is a collection of microservices that are capable to perform required API/RTP service calls and subsequent validations dynamically based on the configuration at the 'User Interface' module.

16 Claims, 9 Drawing Sheets

(56)                     References Cited

U.S. PATENT DOCUMENTS

| 11,748,686 B1 * | 9/2023 | Kwan ................. G06F 11/3684 |
| | | 705/7.27 |
| 11,818,134 B1 * | 11/2023 | Gibson ................ H04L 63/102 |
| 2018/0314622 A1 * | 11/2018 | Lowe .................. G06F 11/3616 |
| 2020/0097964 A1 * | 3/2020 | Mittal .................... G06Q 20/14 |
| 2020/0401506 A1 * | 12/2020 | Sathianarayanan .......................... |
| | | G06F 11/3688 |
| 2021/0240551 A1 * | 8/2021 | Joyce ..................... H04L 67/02 |
| 2025/0232322 A1 * | 7/2025 | Batts ................. G06Q 30/0201 |

OTHER PUBLICATIONS

Written Opinion for International Application No. PCT/IB2021/060648; International Filing Date—Nov. 17, 2021; mailed Feb. 23, 2022; 7 pages.

* cited by examiner

101

1 day installation

Access RtP QA Framework
locally or via your browser,
configure your services and
select the test cases

102

Biller & Payer

Test various scenarios, be it
a Biller or a Payer. Test
decline, part pay, message
and full payment options

103

Go live quicker

Use the RtP QA Framework
to accelerate your time to
market, reducing up to 8
days per cycle.

600

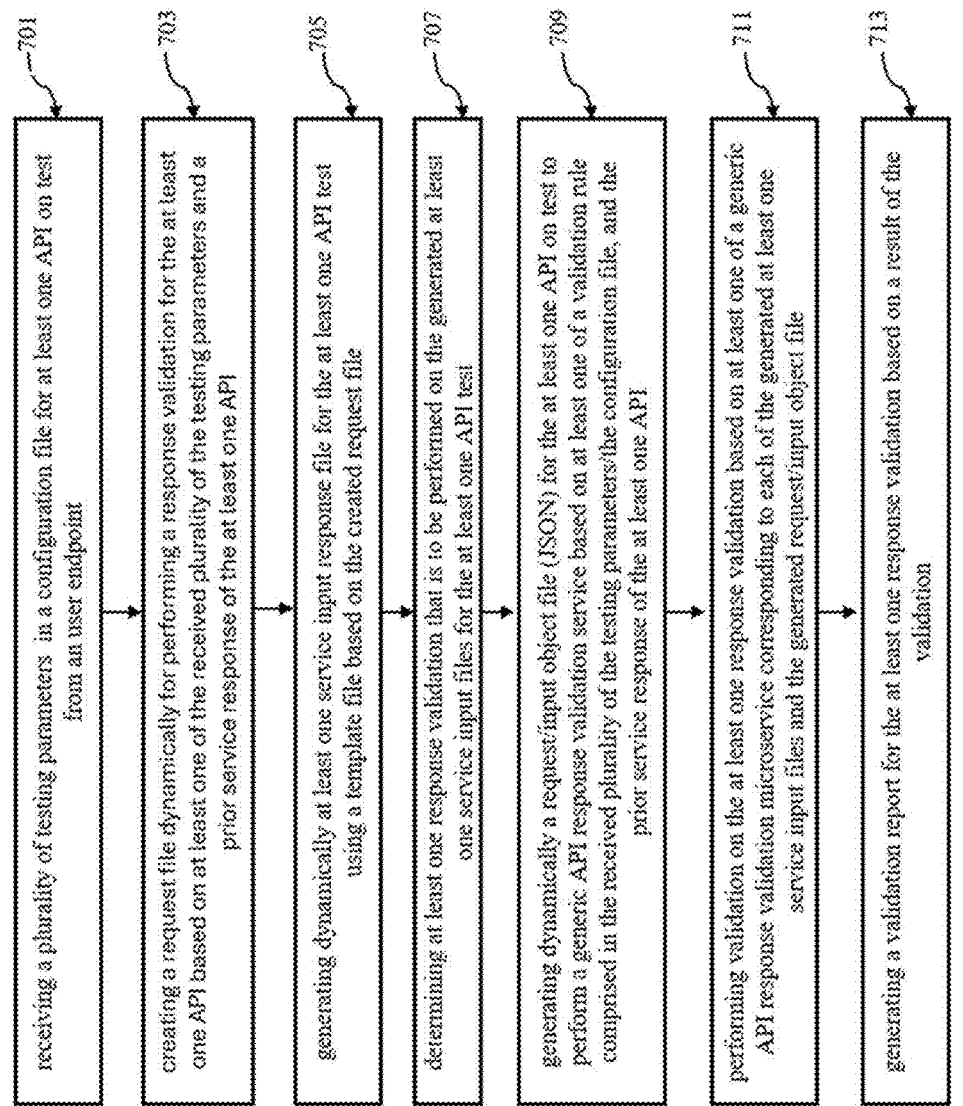

701   receiving a plurality of testing parameters in a configuration file for at least one API on test from an user endpoint 703   creating a request file dynamically for performing a response validation for the at least one API based on at least one of the received plurality of the testing parameters and a prior service response of the at least one API 705   generating dynamically at least one service input response file for the at least one API test using a template file based on the created request file 707   determining at least one response validation that is to be performed on the generated at least one service input files for the at least one API test 709   generating dynamically a request/input object file (JSON) for the at least one API on test to perform a generic API response validation service based on at least one of a validation rule comprised in the received plurality of the testing parameters;the configuration file, and the prior service response of the at least one API 711   performing validation on the at least one response validation based on at least one of a generic API response validation microservice corresponding to each of the generated at least one service input files and the generated request/input object file 713   generating a validation report for the at least one response validation based on a result of the validation

SYSTEM AND METHOD FOR SCRIPT-LESS AUTOMATION FOR RTP TESTING OR ANY API TESTING

CROSS-REFERENCE TO RELATED APPLICATIONS

This Application is a U.S. National Stage Application of PCT/IB2021/060648 filed Nov. 17, 2021, which claims priority to India application No. 202111022970, filed May 24, 2021, and all the benefits accruing therefrom under 35 U.S.C. § 119, the content of which is incorporated by reference in its entirety.

FIELD OF THE INVENTION

The present disclosure, in general, relates to a system and method for script-less automation for Application Programming Interface (API) testing. In particular, the present invention relates to provide a generic template-based script less automation technique for secure messaging services.

BACKGROUND

With the recent developments Recently various work to provide a secure messaging service framework for providing numerous payment services has been provided. Such secure messaging services are termed as request to pay (RTP) services. For example, PAY.UK has recently announced a new secure message service called Request To Pay (RTP). It is an overlay on top of existing payments infrastructure. RTPs provides as a new flexible way to manage and settle bills between businesses and organizations as well as among friends. For each 'request', the payer will be able to pay in full, pay in part, ask for more time or decline to pay and begin a dialogue with the requester. It gives more control to the person being asked to pay, but it also gives the Biller all the information they will need to reconcile the payment when it arrives. The Framework is intended to help services providers to develop their services that interoperate with each other to deliver Request to Pay to their customers.

It is forecasted that majority of the market will have a RTP consumers as a biller or payer, the new RTP APIs and corresponding integrated systems from different corporates or service providers have to undergo a required quality assurance at different levels. A 'Time to market' would be the main factor to rollout RTP on time from various business units and which requires high speed test automation at all levels.

There are number of tools available in the market to do RTP testing like any other API testing using SoapUI, Postman, Selenium, etc. All these tools require coding effort to prepare an automated test pack and a regular maintenance effort to update the automation code according to the changes in the business rules and corresponding validation. Thus, it can be gathered that conventional methods of testing RTP requires:

Manually using a custom scripted framework
Using a tool that can generate Requests and Response and validate the results
More advanced user may even use model-based script less automation The above-mentioned methods list above will involve some level of test preparation, design, and scripting effort. Further, advanced model-based script less automation approach will capture the application behavior first and then creates automated tests in the test framework. Once it's captured the user will fine tune the automated tests created during its initial reference test manually then move on to the automated run. Further, it has to keep capturing the behaviour of the application under test when migrating the automated solution from application to application/client-to-client.

Thus, as may be seen, there exists a need to provide a methodology in order to overcome one of the above-mentioned problems.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

According to an embodiment of the present disclosure, a method and system for template based API testing for request to pay (RTP) services is being disclosed. The method includes receiving a plurality of testing parameters in a configuration file for at least one API on test from an user endpoint. Then, creating a request file dynamically for performing a response validation for the at least one API based on at least one of the received plurality of the testing parameters and a prior service response of the at least one API. Then generating dynamically at least one service input response file for the at least one API test using a template file based on the created request file and determining at least one response validation that is to be performed on the generated at least one service input files for the at least one API test. The method further generates dynamically a request/input object file (JSON) for the at least one API on test to perform a generic API response validation service based on at least one of a validation rule comprised in the received plurality of the testing parameters/the configuration file, and the prior service response of the at least one API. Then performing validation on the at least one response validation based on at least one of a generic API response validation microservice corresponding to each of the generated at least one service input files and the generated request/input object file; and generating a validation report for the at least one response validation based on a result of the validation.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein:

FIG. 7 illustrates a flow chart for template based API testing for request to pay (RTP) services based on script-less automation, according to an embodiment of the present disclosure.

Figure 1:
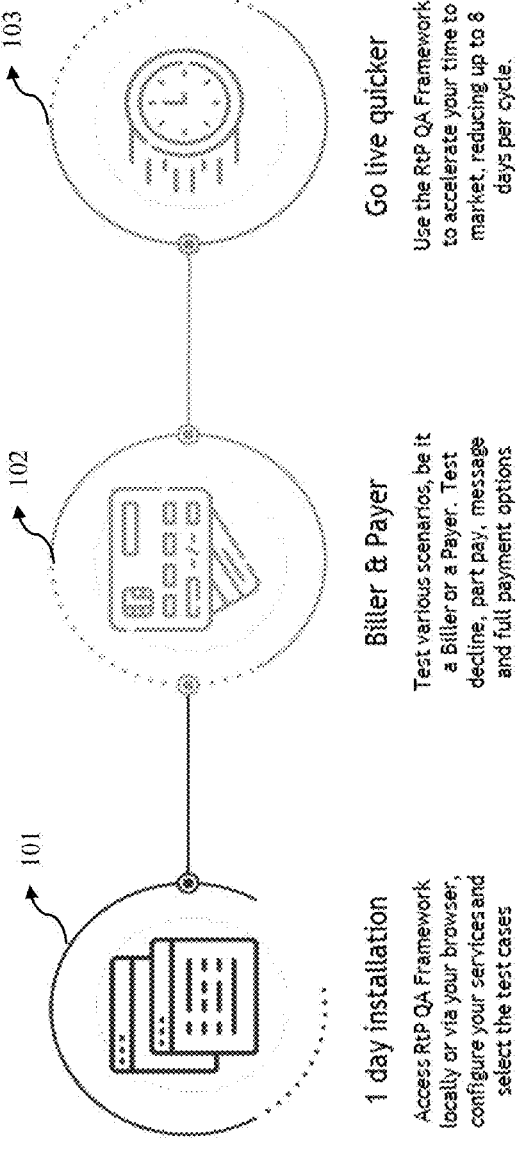
FIG. 1 illustrates an overall logical flow mechanism for script-less automation for Application Programming Interface (API) testing, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

According to the embodiment of the present disclosure, a system and method for script-less automation for Application Programming Interface (API) testing is being disclosed. Particularly, a template based API testing for Request to Pay (RTP) services is being disclosed. According to an embodiment a template based API testing for RTP services generates dynamically a request/input object file (JOSON) for at least one API which is under test to perform a generic API response validation service. The generic API response validation service may be performed based on validation rules included in one or more of a testing parameters/a configuration file of a service response and a prior service response of the API which is under test. According to further embodiment, a validation is performed for the API which is under test based on a generic API response validation microservices and the generated request/input object file. Thus, providing a template based API testing thereby avoiding creating or generating numerous request/input object file (JSON) for the one or more API's on test as compared to a state of the art. A detailed explanation will explain in the forthcoming paragraphs below.

FIG. 1 illustrates an overall logical flow mechanism for script-less automation for Application Programming Interface (API) testing for RTP services, according to an embodiment of the present disclosure. According to the FIG. 1, at block 101 initially installation process may be performed at a use end point or a client end point. Here in particular, an access to RTP QA Framework, is being performed locally or via any browser at the client end or the user end. As an example, the client end and the user end may include one or more users that wants to utilize the RTP types of services for payments. As an example, the RTP type of services may include online payment services in banking sectors and the like. As a further example, the client end and the user end may be a same entity or maybe different entity, according to the embodiment of the present disclosure. Furthermore, the client end or the user end may be alternatively referred as a client end point or a user end point, a client or a user, biller or a payer respectively throughout the disclosure without deviating from the scope of the disclosure.

Thereafter, configuration of services and selection of the test cases is being done by the client or the user. Thereafter, the process moves to the block 102 associated with a platform to the biller and the payers. At the block 102 test various scenarios of the APU under test may be performed for the biller or the payer. Now, after performing various test scenarios, the API under test may be declined or part pay may be performed, or messaging may be done, or fill payment options may be provided. The block 103 offers test API to go to live quickly thus accelerating the time to market and reducing a substantial number of days per cycle. A detailed explanation will explain in the forthcoming paragraphs below.

Figure 2:
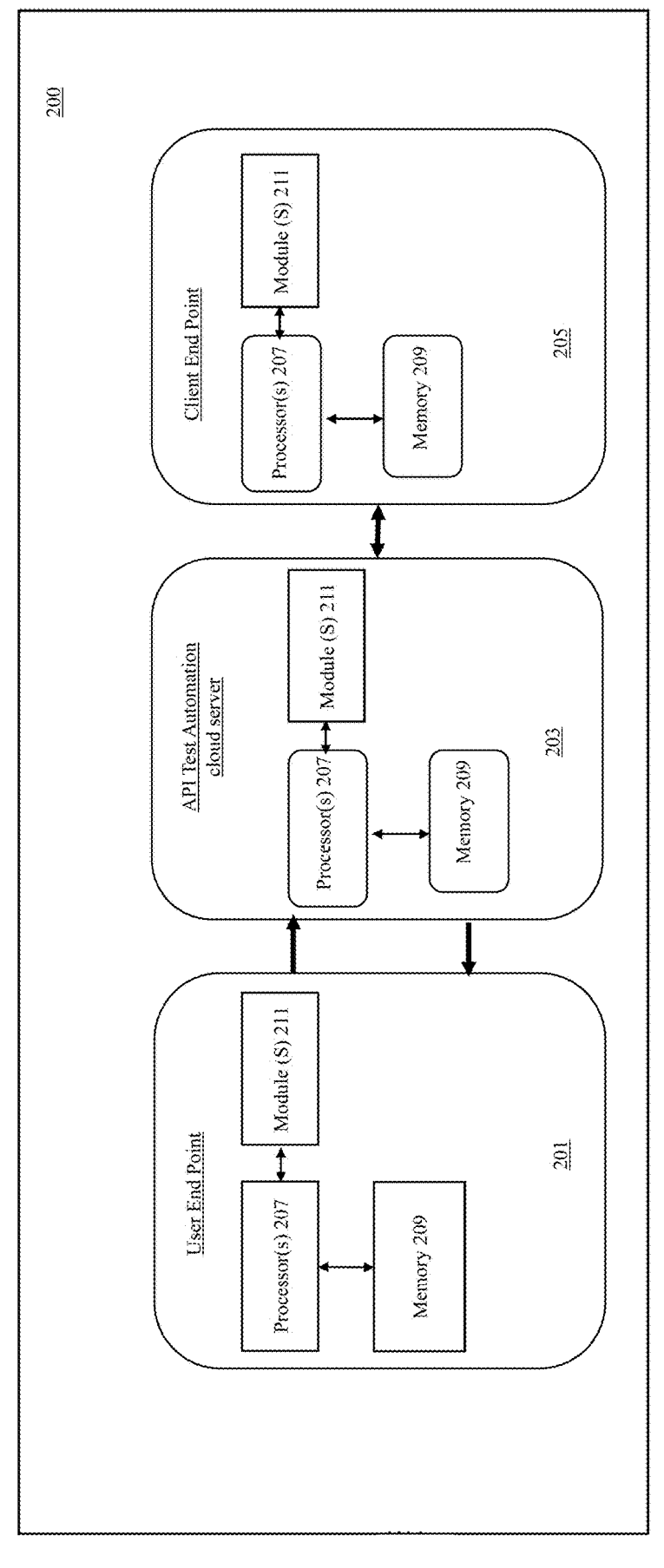
FIG. 2 illustrates a general networking environment 200A implementing a system 200 for template based API testing for request to pay (RTP) services, according to an embodiment of the present disclosure.

FIG. 2 illustrates a general networking environment 200A implementing a system 200 for template based API testing for request to pay (RTP) services, according to an embodiment of the present disclosure. According to the FIG. 2A, the system 200 may include one or more user end point 201 operatively coupled with an API Test Automation cloud server 203, and a client end Point 205 via any wireless network.

As an example, the system 200 may be, but not limited to, a distributive network system. The system 200 may include the one or more user end pint 201 and the one or more client end point 203. For the sake of brevity, only one user end pint 201 and one client end point has been shown. The wireless network may include any type or a global area network (GAN), such as the Internet, a number of local area networks (LANs) broadband networks, wide area networks (WANs), etc. The wireless network may include the Internet or incorporate portions thereof, such intranet(s), extranet(s), etc. Further, the wireless network 202 may incorporate one or more LANs, wireless portions and may incorporate one or more of various protocols and architectures such as TCP/IP, Ethernet, ATM, etc.

As a further example, the user end point 101 and the client end point 103 may correspond to various devices such as a personal computer (PC), a tablet PC, a personal digital assistant (PDA), a mobile device, a palmtop computer, a laptop computer, a desktop computer, a communications device, a computation hub device, or any other machine capable of executing a set of instructions.

As a further example, the user end point 101, the client end point 103, the API Test Automation cloud Server 203 may include one or more processors 207, coupled with a memory 209 and a one or modules 211. As an example, the one or more processors 207, coupled with a memory 209 and a one or modules 211 at the API Test Automation cloud Server 203 may be implemented in any computing device or may be implemented virtual server.

In an example, the processor 207 may be a single processing unit or a number of units, all of which could include multiple computing units. The processor 207 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 207 is configured to fetch and execute computer-readable instructions and data stored in the memory 209.

The memory 209 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s) 211 may include a program, a subroutine, a portion of a program, a software component or a hardware component capable of performing a stated task or function. As used herein, a module(s) 211 may be implemented on a hardware component such as a server independently of other modules, or a module can exist with other modules on the same server, or within the same program. The module(s) 211 may be implemented on a hardware component such as processor one or more microprocessors, microcomputers, microcontrollers, digital signal processors, central processing units, state machines, logic circuitries, and/or any devices that manipulate signals based on operational instructions. The module(s) 211 when executed by the processor(s) 207 may be configured to perform any of the described functionalities.

Figure 3:
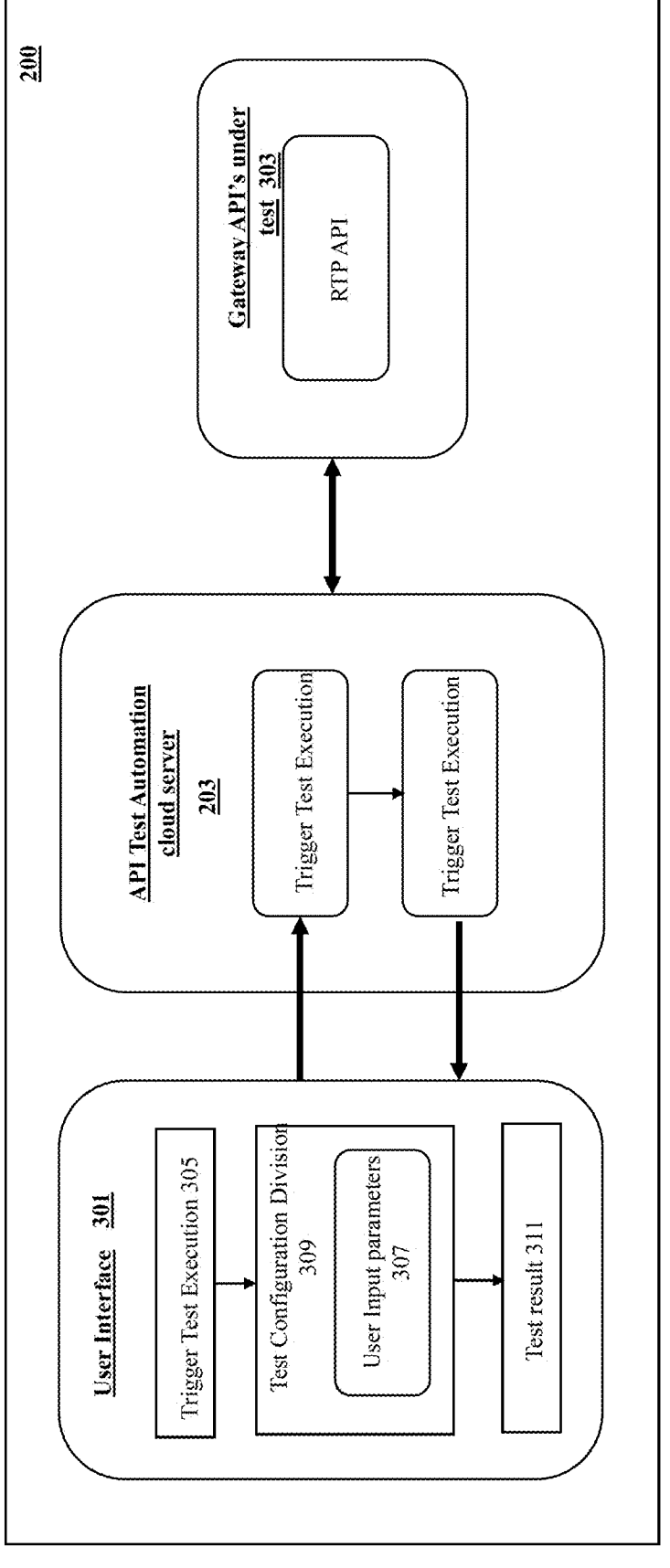
FIG. 3 illustrates a detailed networking environment 200A implementing a system 200 for template based API testing for request to pay (RTP) services, according to an embodiment of the present disclosure.

As an example, a database 339 may be operatively coupled with the API test automation server 203 as shown in the FIG. 3. The database 339 may be implemented with integrated hardware and software. The hardware may include a hardware disk controller with programmable search capabilities or a software system running on general-purpose hardware. The examples of database are, but not limited to, in-memory database, cloud database, distributed database, embedded database and the like. The database 339, amongst other things, serves as a repository for storing data processed, received, and generated by one or more of the processors 339, and modules 211.

The modules may be implemented with an AI module that may include a plurality of neural network layers. Examples of neural networks include, but are not limited to, convolutional neural network (CNN), deep neural network (DNN), recurrent neural network (RNN), Restricted Boltzmann Machine (RBM). The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning. At least one of a plurality of CNN, DNN, RNN, RMB models and the like may be implemented to thereby achieve execution of the present subject matter's mechanism through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

FIG. 3 illustrates a detailed networking environment 200A implementing a system 200 for template based API testing for request to pay (RTP) services, according to an embodiment of the present disclosure. A plug and play solution that focuses on achieving better time to market, reducing costs, increasing quality and avoiding human intervention wherever possible. FIG. 3 will be explained with the help of the FIGS. 1-2 for ease of explanation. Further, same reference numerals may be used wherever applicable for the sake of brevity and ease of explanation.

Referring to the FIG. 3, a RTP Pre-Fabricated API test Suite-Auto Pay Test system may be referred as the system 200 as shown in the FIG. 2 includes at least a 'User Interface' (UI) 301 component deployed at the user end point 201 or a client end point 203 or at any user equipment.

As an example, the UI 301 may be a graphical user interface (GUI), and/or interfaces that may be configured to act as an output interface for the user at the user end point 201 or the client end point 203 in an output device. The GUI may refer to a graphics display provided on a display (e.g., screen) of an electronic device. Other examples of the output device may include graphics devices/display devices, computer screens, smart phone display screens, dashboard or any other type of data output device. The output device may display information outputted by the individual devices on a display screen.

The system 200 further includes a 'central automation solution' component i.e. API test automation server 203 deployed in a cloud platform, and a APIs under test 205 deployed in a gateways. The 'user interface' 301 has a capability to receive one or more testing parameters as an user input parameters in a configuration file for at least one API on test from the user end point 201. The 'user interface' 301 may triggers test execution 305 for any RTP scenarios as a biller or payer. The user interface' 301 may configures the received user inputs parameters 307 at a test configuration Division module 309. The configured user inputs parameters 307 are further process for test data & validation rules to output a test result 311 via a test result dashboard to view the test execution results and test artefacts on the GUI.

A 'central automation solution' component i.e. API test automation cloud server 203 includes one or more microservices which are capable to perform required RTP service calls to corresponding RTP APIs in the API under test 303 and subsequently dynamically validate it based on the configurations in the configuration file at 'User Interface' 301.

Figure 4:
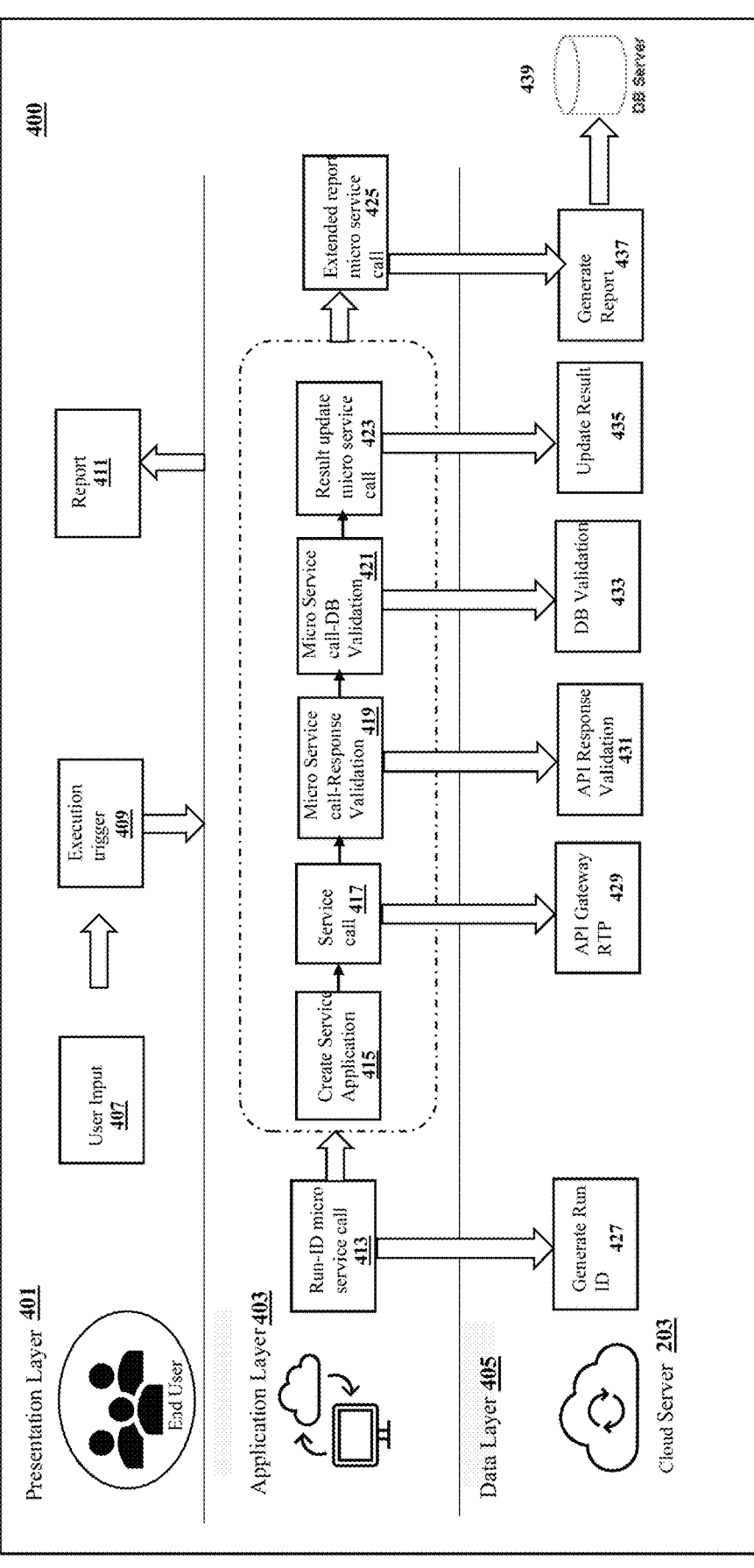
FIG. 4 illustrates a detailed architecture for template based API testing for request to pay (RTP) services, according to an embodiment of the present disclosure.

FIG. 4 illustrates a detailed architecture for template based API testing for request to pay (RTP) services, according to an embodiment of the present disclosure. The architecture 400 includes a presentation layer 401, an application layer 403, and a data layer 405. The architecture 400 may be implemented in a system 200 as shown in the FIGS. 1-3. Further a same reference numeral is being kept for the sake of brevity and ease of explanation. A detailed implementation of each layer will be explained below in the forthcoming paragraphs.

According to the embodiment of the present disclosure, the presentation layer 301 is a front-end component from the client end point 203 or the user end point 201. All the test inputs are provided in the Presentation Layer 401. As an example, the Presentation Layer 401 may be implemented in the user end point 201 and the client end point 203. The presentation layer 301 consists of mainly of three different sub modules.

Continuing the same embodiment, the user inputs 307 comprised of a test scenario module, a Test Data & Assertions module and a API Request Template module (not shown in the figure). According to an embodiment, the test scenario module may select the required RTP scenarios for execution in a predefined scenario list or user can configure new test scenarios instantaneously. As an example, sending a new PAM request from biller to payer and validate the RTP Pre-Authorization Messaging. According to a further embodiment, the test data & assertions module is the entry point for the user to provide required test data and validation details to the test configuration division 309 for further processing. A specific format is available for the user to enter the data. As an example, the user can provide data by various options such as Excel sheet, XML file, GUI, Database, etc. According to the yet further embodiment, the API Request Template configures to create dynamic API requests. The template is placed in a folder and the path can be configured in the tool.

According to the further embodiment, the presentation layer 401 further includes an Execution Trigger 409 module. The user may trigger the test execution. The Execution Trigger 409 module may be configured as an executable file or from web application/CI CD pipeline.

According to the further embodiment, the presentation layer 401 further includes a Reports module 411. The reports module 411 provide a user-friendly report on test execution. During the test execution, the detail will be stored to a central database. There is a microservice exposed to users as a configurable item. The report can be saved to a folder or displayed to any dashboards using the microservice. The reports herein may be alternately referred as a validation reports.

Further continuing with the same embodiment, the system 400 further includes an Application Layer 403. As an example, the Application Layer 403 may be implemented in the API test automation cloud server 203. The API test automation cloud server 203 may be alternately referred as a cloud server without deviating from the scope of the disclosure. According to an embodiment, the Application Layer 403 may include a Run ID Microservice 413, a Create Service Application 415, a Microservice-Response Validation 419, a Microservice-Database Validation 421, a Microservice-Result Update 423, Microservice-Extended Report 425. The Application Layer 403 communicates with the data later 405. The data layer 405 is a DevOps platform where one or more microservices are hosted, external APIs/Gateway/Environments, and central database was hosted. A detailed explanation of each module of the application layer 403 will be explained in detail in the forthcoming paragraphs.

According to an embodiment, the Application Layer 403 the core component of the script less automation service that does control and execution of all internal microservices in an orchestrational order to complete the flow with required validations.

According to an embodiment of the present disclosure, the Run ID Microservice 413 is a microservice which may be called for creating a run id in the central database. The respective tests and related test artefacts under the run are mapped against this id. In an embodiment, the Run ID Microservice call 413 gets the plurality of testing parameters in a configuration file for at least one API on test from a user endpoint 203 for performing response validation of the API under test. As an example, the plurality of testing parameters includes, but not limited to, at least one of test scenarios, an API template input file, a test data, and validation parameters. Thereafter, a corresponding Run ID may be generated at a generate Run ID block 427.

Continuing with the same embodiment, the Create Service Application 415 is an internal application developed to create RTP API requests dynamically based on the user inputs and the templates provided. In particular, the Create Service Application 415 may create a request file dynamically for performing a response validation for the at least one API based on at least one of the received pluralities of the testing parameters and a prior service response of the at least one API. Accordingly, a service call 417 may be a trigger to respective RTP API under test gateways/test environments 429 once the API request is created dynamically. This service call 417 manages the responses from RTP services and passing the responses to a Microservice-Response Validation 419 for response validation In particular, the service call 417 may generate dynamically at least one service input response file for the at least one API test using a template file based on the created request file.

Continuing with the same embodiment, the Microservice-Response Validation 419 is a generic microservice to validate the RTP API response contents based on the configured validation rules in the configuration file. It can be called or configured based on user requirements. In particular, after, generating dynamically at least one service input response file for the at least one API test by the service call 417, the Microservice-Response Validation 419, may determine at least one response validation that is to be performed on the generated at least one service input files for the at least one API test. Thereafter, the Microservice-Response Validation 419 may generates dynamically a request/input object file (JSON) for the at least one API on test to perform a generic API response validation service based on at least one of a validation rule comprised in the received plurality of the testing parameters/the configuration file, and the prior service response of the at least one API. Then the Microservice-Response Validation 419 performs validation on the at least one response validation based on at least one of a generic API response validation microservice corresponding to each of the generated at least one service input files and the generated request/input object file.

According to the embodiment, the Microservice-Response Validation 419 performs the validation on the at least one response validation by calling an API response validation 431 module. According to this embodiment, the API response validation 431 performs the validation on the at least one response by initiating a microservice corresponding to the at least one response validation. Then, the API response validation 431 module creates a new request file based on at least one of the at least one service response files and the plurality of the testing parameters/configuration file for the at least one API test. Further, the plurality of the testing parameters/configuration file included in one or more validation nodes for the at least one API test that is to be validated. As an example, the validation nodes may be the user endpoint 201 or the client end point 203.

According to the further embodiment, the application layer 403 further includes a microservice-database validation module 421. The microservice-database validation module 421 is another generic Microservice to validate the API responses against databases values if any. This will be called or configured based on the user requirements and all necessary SQL will be generated dynamically within the microservice.

According to the embodiment, if the API under test is to be performed for a database validation or a log validation, then the create service application 415 may create dynamically a request file for performing at least one of a database validation and a log validation, based on the received plurality of the testing parameters. As explained above, the plurality of the testing parameters are received from a client or user or client end point or user end point. In the FIG. 4, the database validation is being shown, however, on the similar manner log validation may also be performed as per the user requirement and based on the received plurality of the testing parameters. Thus, the explanation will be made henceforth with respect to both log validation and the database validation.

Accordingly, a service call 417 may be trigger to respective API gateways/test environments 429 once the API request is created dynamically. In particular, the service call 417 may generate dynamically at least one service input response file corresponding to the at least one of a database validation and a log validation, for the at least one API test using a template file based on the created request file.

Continuing with the same embodiment, the Microservice-call database Validation 421 is a generic microservice to validate the RTP API response contents for database validation. Similarly, the Microservice-call log Validation (not shown) is a generic microservice to validate the RTP API response contents for log validation and can be called or configured based on user requirements. In particular, after, generating dynamically at least one service input response file for the at least one API test for either database or log validation by the service call 417, the Microservice-call database Validation 421 or the Microservice call log validation (not shown), may determine at least one of database validation and a log validation that is to be performed on the generated at least one service input files for the at least one API test. Thereafter, the Microservice-call database Validation 421 or the Microservice call log validation (not shown) may generates dynamically a request/input object file (JSON) corresponding to the at least one of the database validation and the log validation, for the at least one API on test based on plurality of the testing parameters and the prior service response of the API. Then the Microservice call-database Validation 431 or the Microservice call log validation (not shown) performs validation on the at least one of the database validation and the log validation based on at least one of a generic database validation microservice or a generic log validation microservice corresponding to each of the generated at least one service input files, and the generated request/input object file.

According to the embodiment, the Microservice-call database Validation 421 or the Microservice-call response Validation (not shown) performs the validation on the at least one database validation or log validation by calling an DB validation 433 module or a log validation module (not shown). According to this embodiment, the DB validation 433 module or the log validation module (not shown) performs the validation on the at least one of database validation or the log validation by initiating a microservice corresponding to the at least one of database validation or the log validation. Then, the DB validation 433 module or the log validation module (not shown) creates a new request file based on at least one of the configuration file/the plurality of received parameters for the at least one API test. Further, the microservice is comprised in the at least one of the generic database validation microservice or the generic log validation microservice database. Further, the configuration file/the plurality of received parameters includes one or more database validation rules for the at least one API test that is to be validated, and the validation is performed based on the created new request file.

According to the further embodiment, the validation of the at least one of the database validation or the log validation is performed based on the configuration file/plurality of received parameters and a previous response of at least one of the databases or the log validation related to the created requested file.

Figure 5:
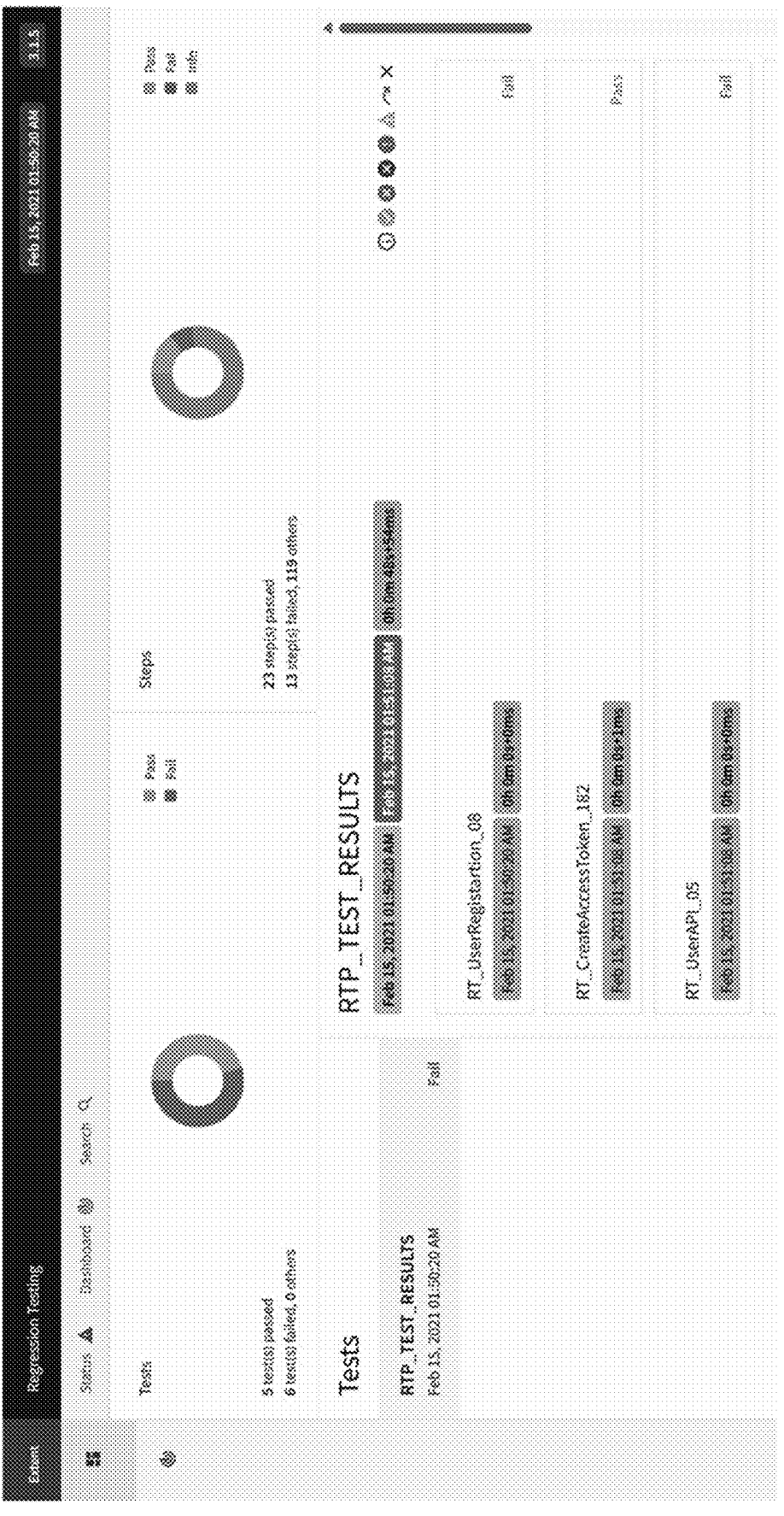
FIG. 5 illustrates an example of the test results in the form of test report, according to an embodiment of the present disclosure.

Continuing with the same embodiment, a Microservice-Result Update 423 updates a test results for each test using this microservice. In particular, Microservice-Result Update 423 call an update test result 435 module for updating the each test result into the DB server 439. Further, the Microservice-Extended Report 323 module is microservice that generates a validation report for the at least one response validation based on a result of the validation. Further, the generated validation report may be stored in the DB server 439. The validation report may be shown via report 411 module on the presentation layer 401. The validation report is a user-friendly test execution results and display to the user as HTML page. It enables the user to view the test execution results in a seamless manner without any need to write special code. An example of the test results in the form of test report is shown in the FIG. 5. The report may indicate a pass or fail with green or red colour.

Figure 6:
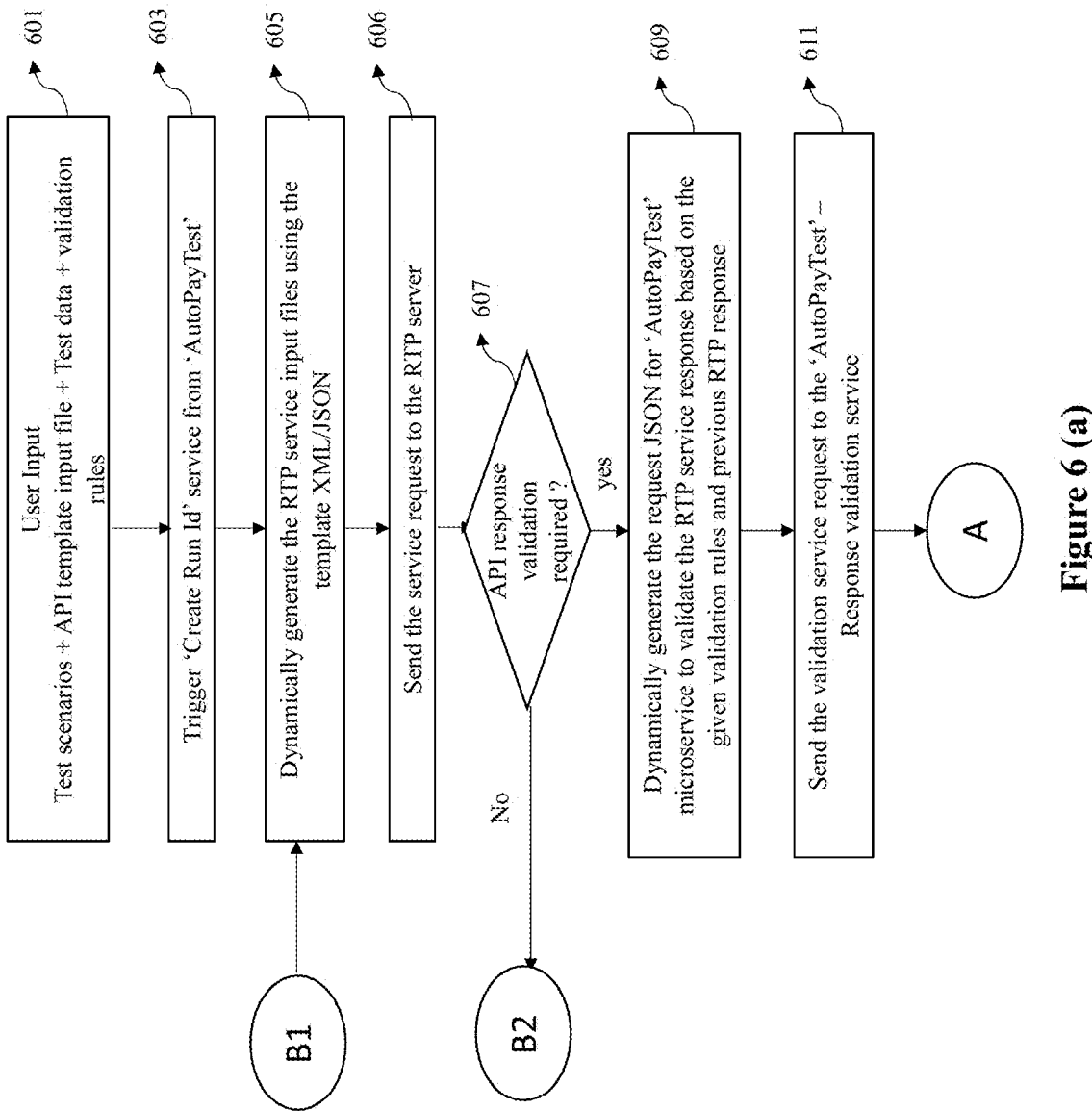
FIG. 6 illustrates an operational method steps implemented in the architecture of FIGS. 2-4 for template based API testing for request to pay (RTP) services based on script-less automation, according to an embodiment of the present disclosure.
Figure 6:
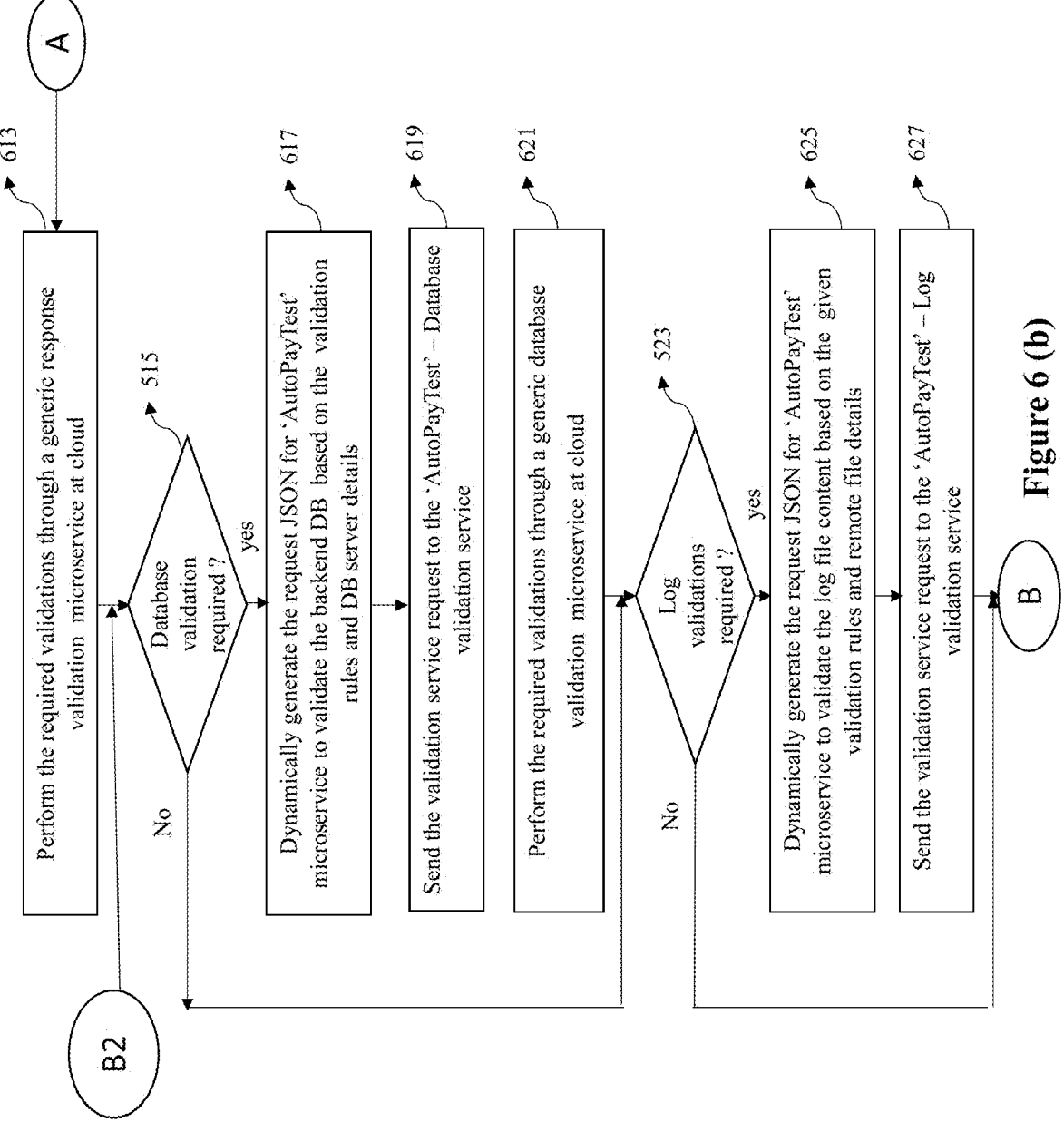
Figure 6:
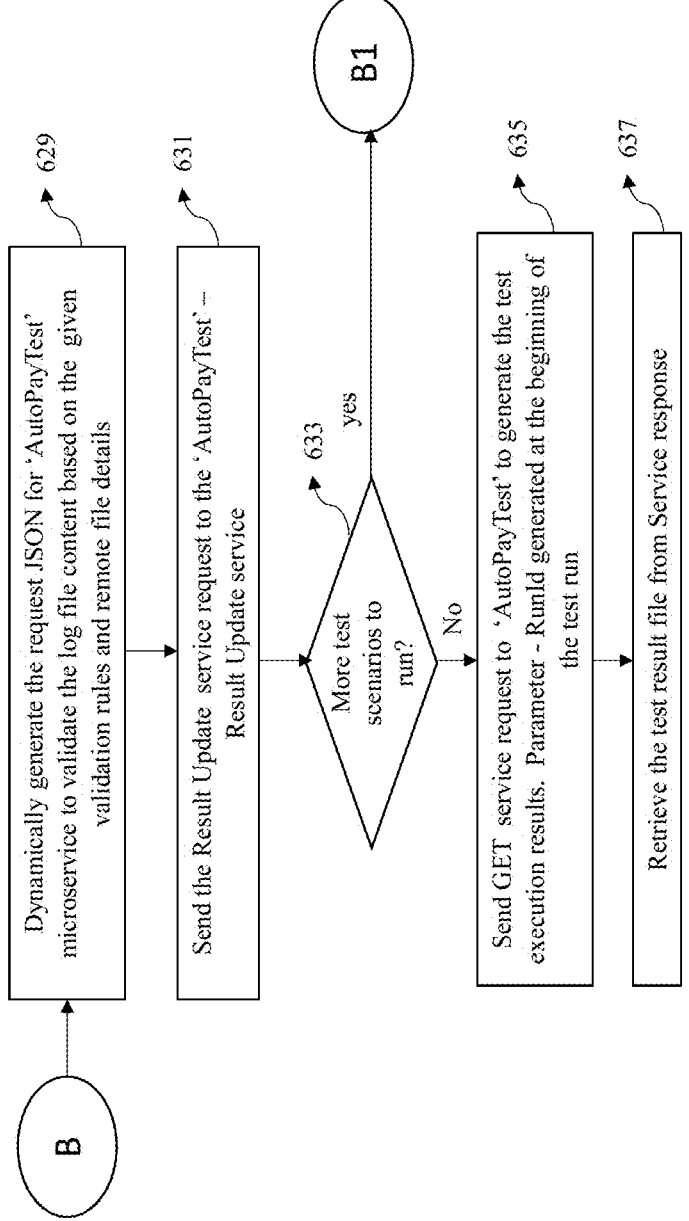

FIG. 6 illustrates an operational method steps implemented in the architecture of FIGS. 2-4 for template based API testing for request to pay (RTP) services based on script-less automation, according to an embodiment of the present disclosure. The method 600 is implemented in the architecture 400 that includes presentation layer 401, application layer 403, and a data layer 405. The explanation of the method 600 will be made by referring to the FIGS. 2-5.

Initially at step 601, the method 600 takes the user input as plurality of testing parameters that includes Test scenarios, API template input file, Test data, validation rules and the like. Sample test scenarios are listed in table 1.

sends the validation service request to the 'AutoPayTest'—Database validation service. And then at step 621, the

TABLE 1 test case scenarios

| SI# | TestCase Description | Step1 | Step2 | Step3 | Step4 |
|---|---|---|---|---|---|
| Sample test 1 | Register New End User | ServiceCall_createUser | ResponseValidation_user | | |
| Sample Test2 | Sends a new RTP message with the sender corresponding to the logged in repository user | ServiceCall_createMessage1 | ResponseValidation_msg | | |
| Sample Test3 | Sends a new PAM request from biller to payer | ServiceCall_accessToken2 | ServiceCall_PAM1 | ResponseValidation_PAM1 | DBValidation_PAM1 |

Then, at step 603, a trigger defined as 'Create Run Id' service is generated from 'AutoPayTest' request of the API under test. Thereafter, at step 605 the method 600, dynamically generate a RTP service input files using the template XML/JSON. The RTP service input files may be alternately referred as the service input response file.

Then at step 606, the method 600 sends a service request to the API test automation cloud server 203. After that the method 600, at step 607 checks/determines for API response validation. If the result is yes then the process 600, at step 609 dynamically generate the request JSON file or an request/input object file (JSON) for 'AutoPayTest' microservice to validate the RTP service response based on the given validation rules and previous RTP response. If the result is no then the method 600 then moves to block 615. According to, step 607, it is a configuration item for the user, API response validation is required or not. From the sample tests listed in table 1—sample tests 1 & 2 are configured for Response validation after the service call. Sample test 3 is configured for response validation and DB validation as per the user requirement.

Thereafter, at step 611, the method 600 sends a validation service request to the 'AutoPayTest'-Response validation service. And then at step 613, the method 600 performs the required validations through a generic response validation microservice at the cloud server 203. Example of API response validation configurations: JSON path and the expected value in that path during the test run is as shown below:

$.messages[:1].recipientPid=user12#abc.com
$..additionalUserInfo.address.country=UK Now, at step 615, the method 600 checks for database validation requirement. If it is determined that the database validation required then the method 600 move to step 617, where the method 600, dynamically generates the request JSON for 'AutoPayTest' microservice to validate the backend DB based on the validation rules and DB server details, else step 623 is being performed. Here, the selection approach is same as log validation and API response validation—User can select this validation is required or not for each test scenarios. Thereafter, at step 619, the method 600 method performs the required validations through a generic database validation microservice at cloud. Thereafter, at step 623, the log validation requirement is being checked. In general Quality Engineering standpoint, An API application test includes different validations after the API call. The validations includes—API response validation and/or backend database validation and/or log file validations. At this step it performs the validation if the configuration is set to 'Y' for log file validations. Now if it is determined that the log validation is required then the method 600, dynamically generate the request JSON for 'AutoPayTest' microservice to validate the log file content based on the given validation rules and remote file details at step 625, else the method moves to perform step 629. Now at step 627, the method 600, sends the validation service request to the 'AutoPay-Test'—Log validation service.

Thereafter, at step 629, the method 600, Dynamically generate the request JSON for 'AutoPayTest' microservice to validate the log file content based on the given validation rules and remote file details. Then, at step 631, the method 600 sends the result update service request to the 'AutoPay-Test'—result update service. Now at step 633, it was determined to run more test scenarios as shown in the table 1. If it is determined yes then the method 600 perform the step 605, else the method 600, sends GET service request to 'AutoPayTest' to generate the test execution results. Parameter—RunId generated at the beginning of the test run at step 635. Then retrieve the test result file from Service response 637.

FIG. 7 illustrates a flow chart for template based API testing for request to pay (RTP) services based on script-less automation, according to an embodiment of the present disclosure. The method 700 is implemented in the architecture 400 that includes presentation layer 401, application layer 403, and a data layer 405. The explanation of the method 700 will be made by referring to the FIGS. 2-6. A detailed explanation of the same is omitted here for the sake of brevity.

Initially at step 701, the method 700, includes receiving a plurality of testing parameters in a configuration file for at least one API on test from an user endpoint. The step 701 corresponds to the step 601 of the FIG. 6. Then at step 703, the method 700 creates a request file dynamically for performing a response validation for the at least one API based on at least one of the received plurality of the testing parameters and a prior service response of the at least one API. The step 703 corresponds to the step 603 of the FIG. 6. Then at step 705, the method 700 generates dynamically at least one service input response file for the at least one API test using a template file based on the created request file. The step 705 corresponds to the step 605 of the FIG. 6. Thereafter, at set 707, the method 700 determines at least one response validation that is to be performed on the generated at least one service input files for the at least one API test. The step 707 corresponds to the step 707 of the FIG. 6.

The method 700 further includes generating, at step 709, dynamically a request/input object file (JSON) for the at least one API on test to perform a generic API response validation service based on at least one of a validation rule comprised in the received plurality of the testing parameters/ the configuration file, and the prior service response of the at least one API. The step 709 corresponds to the step 609 of the FIG. 6.

Thereafter, at step 711, the method 700, includes performing validation on the at least one response validation based on at least one of a generic API response validation microservice corresponding to each of the generated at least one service input files and the generated request/input object file. The step 711 corresponds to step 613 of the FIG. 6. In particular, the performing of the validation on the at least one response validation includes initiating a microservice corresponding to the determined at least one response validation, wherein the microservice is comprised in the generic API response validation microservice. Then, creating a new request file based on at least one of the at least one service response files and the plurality of the testing parameters/ configuration file for the at least one API test, wherein the plurality of the testing parameters/configuration file comprises one or more validation nodes for the at least one API test that is to be validated, and wherein the validation is performed based on the created new request file. In an implementation, the plurality of testing parameters comprising at least one of test scenarios, an API template input file, a test data, and validation parameters, wherein the validation of the at least one response validation is performed based on the configuration file and a previous response validation related to the created requested file.

According to the further implementation, the method 700 includes creating dynamically a request file for performing at least one of a database validation and a log validation, based on the received plurality of the testing parameters, wherein the plurality of the testing parameters are received from a client.

According to further implementation, the method 700 includes generating dynamically at least one service input response files, corresponding to the at least one of a database validation and a log validation, for the at least one API on test using a template file based on the created request file. Then determining at least one of the database validation and a log validation that is to be performed on the generated at least one service input files for the at least one API test and generating dynamically a request/input object file (JSON), corresponding to the at least one of the database validation and the log validation, for the at least one API on test based on the received plurality of the testing parameters, and the prior service response of the at least one API. Thereafter, performing validation on the at least one of the database validation and the log validation based on at least one of a generic database validation microservice or a generic log validation microservice corresponding to each of the generated at least one service input files, and the generated request/input object file: and generating a validation report for the at least one of the database validation or the log validation based on a result of the validation.

In an implementation, the method 700 includes, the performance of the validation on the at least one of the database validation and the log validation comprising, initiating a microservice corresponding to the determined at least one of the database validation and the log validation, wherein the microservice is comprised in the at least one of the generic database validation microservice or the generic log validation microservice database. Then, creating a new request file based on at least one of the configuration file/the plurality of received parameters for the at least one API test, wherein the configuration file/the plurality of received parameters comprises one or more database validation rules for the at least one API test that is to be validated, and wherein the validation is performed based on the created new request file.

According to the method 700, the validation of the at least one of the database validation or the log validation is performed based on the configuration file/plurality of received parameters and a previous response of at least one of the database or the log validation related to the created requested file. Further, the generic database response validation microservice, the generic database validation microservice, and the generic log validation microservice is implemented at a cloud server.

Further at the step 713, the method 700 further generates a validation report for the at least one response validation based on a result of the validation.

Thus, the present disclosure provides following advantages.

100% reusability, repeatability and Zero coding: Prepackaged QA framework, ready in a day based on your requirements, 80% reduction in RTP QA cycle, 100% Script-less: Can be run by anyone, including Developer, QA Manager or Business teams, Delivers 100% test automation coverage, 80% reduction in RTP QA cycles, Improves quality by eliminating manual repetition that could cause human errors, Auto generated report, which gives execution summary, test case details and logs, The solution is scalable and can be ported from one RTP client to another, It can be plugged into most commonly used CI/CD pipeline tools and will deliver, continuous testing capabilities with minimal configuration, Can test any RTP scenarios as a biller or payer.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the disclosure will be described below in detail with reference to the accompanying drawings. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method, for template based Application Programming Interface (API) testing for request to pay (RTP) services, comprising:
   receiving a plurality of testing parameters in a configuration file for at least one API on test from a user endpoint;
   creating a request file dynamically for performing a response validation for the at least one API based on at least one of the received plurality of the testing parameters and a prior service response of the at least one API;
   generating dynamically at least one service input response file for the at least one API on test using a template file based on the created request file;
   determining at least one response validation that is to be performed on the generated at least one service input response file for the at least one API on test;
   generating dynamically a request/input object file (JSON) for the at least one API on test to perform a generic API response validation service based on at least one of a validation rule comprised in the received plurality of the testing parameters/the configuration file, and the prior service response of the at least one API;
   performing validation on the at least one response validation based on at least one of a generic API response validation microservice corresponding to each of the generated at least one service input response file and the generated request/input object file; and
   generating a validation report for the at least one response validation based on a result of the performed validation.

2. The method of claim 1, wherein the performing of the validation on the at least one response validation comprises:
   initiating a microservice corresponding to the determined at least one response validation,
      wherein the microservice is comprised in the generic API response validation microservice;
   creating a new request file based on at least one of the at least one service input response file and the plurality of the testing parameters/the configuration file for the at least one API on test, wherein the plurality of the testing parameters/the configuration file comprises one or more validation nodes for the at least one API on test that is to be validated, and wherein
      the validation is performed based on the created new request file.

3. The method of claim 1, wherein the plurality of testing parameters comprises at least one of test scenarios, an API template input file, a test data, and validation parameters,
   wherein the validation of the at least one response validation is performed based on the configuration file and a previous response validation related to the created request file.

4. The method of claim 1, wherein the method further comprises:
   creating dynamically a request file for performing at least one of a database validation and a log validation, based on the received plurality of the testing parameters, wherein the plurality of the testing parameters is received from a client.

5. The method of claim 4, further comprising:
   generating dynamically at least one service input response file, corresponding to the at least one of the database validation and the log validation, for the at least one API on test using a template file based on the created request file;
   determining at least one of the database validation and the log validation that is to be performed on the generated at least one service input response file for the at least one API on test;
   generating dynamically a request/input object file (JSON), corresponding to the at least one of the database validation and the log validation, for the at least one API on test based on the received plurality of the testing parameters, and the prior service response of the at least one API;
   performing validation on the at least one of the database validation and the log validation based on at least one of a generic database validation microservice or a generic log validation microservice corresponding to each of the generated at least one service input response file, and the generated request/input object file; and
   generating a validation report for the at least one of the database validation or the log validation based on a result of the performed validation.

6. The method of claim 5, wherein the performing of the validation on the at least one of the database validation and the log validation comprising:
   initiating a microservice corresponding to the determined at least one of the database validation and the log validation,
      wherein the microservice is comprised in the at least one of the generic database validation microservice or the generic log validation microservice;
   creating a new request file based on at least one of the configuration file/the plurality of testing parameters for the at least one API on test,
      wherein the configuration file/the plurality of testing parameters comprises one or more database validation rules for the at least one API on test that is to be validated, and wherein the validation is performed based on the created new request file.

7. The method of claim 5, wherein the validation of the at least one of the database validation or the log validation is performed based on the configuration file/plurality of testing parameters and a previous response of at least one of the database validation or the log validation related to the created requested file.

8. The method of claim 5, wherein the generic database response validation microservice, the generic database validation microservice, and the generic log validation microservice is implemented at a cloud server.

9. A system for template based Application Programming Interface (API) testing for request to pay (RTP) services, comprising:

a user endpoint in communication with an API test automation server and a client end point, the API test automation server configured to:

receive a plurality of testing parameters in a configuration file for at least one API on test from the user endpoint;

create a request file dynamically for performing a response validation for the at least one API based on at least one of the received plurality of the testing parameters and a prior service response of the at least one API;

generate dynamically at least one service input response file for the at least one API on test using a template file based on the created request file;

determine at least one response validation that is to be performed on the generated at least one service input response file for the at least one API on test;

generate dynamically a request/input object file (JSON) for the at least one API on test to perform a generic API response validation service based on at least one of a validation rule comprised in the received plurality of the testing parameters, and the prior service response of the at least one API;

perform validation on the at least one response validation based on at least one of a generic API response validation microservice corresponding to each of the generated at least one service input response file and the generated request/input object file; and generate a validation report for the at least one response validation based on a result of the performed validation.

10. The system of claim 9, wherein the API test automation server, for performing of the validation on the at least one response validation, is configured to:

initiate a microservice corresponding to the determined at least one response validation, wherein the microservice is comprised in the generic API response validation microservice;

create a new request file based on at least one of the at least one service input response file and the plurality of the testing parameters/the configuration file for the at least one API on test, wherein the plurality of the testing parameters/the configuration file comprises one or more validation nodes for the at least one API on test that is to be validated, and wherein the validation is performed based on the created new request file.

11. The system of claim 9, wherein the plurality of testing parameters comprises at least one of test scenarios, an API template input file, a test data, and validation parameters, wherein the validation of the at least one response validation is performed based on the configuration file and a previous response validation related to the created request file.

12. The system of claim 9, wherein the API test automation server is further configured to:

create dynamically a request file for performing at least one of a database validation and a log validation, based on the received plurality of the testing parameters, wherein the plurality of the testing parameters is received from a client.

13. The system of claim 12, wherein the API test automation server is further configured to:

generate dynamically at least one service input response file, corresponding to the at least one of the database validation and the log validation, for the at least one API on test using a template file based on the created request file;

determine at least one of the database validation and the log validation that is to be performed on the generated at least one service input response file for the at least one API on test;

generate dynamically a request/input object file (JSON), corresponding to the at least one of the database validation and the log validation, for the at least one API on test based on the received plurality of the testing parameters, and the prior service response of the at least one API;

perform validation on the at least one of the database validation and the log validation based on at least one of a generic database validation microservice or a generic log validation microservice corresponding to each of the generated at least one service input response file, and the generated request/input object file; and generate a validation report for the at least one of the database validation or the log validation based on a result of the performed validation.

14. The system of claim 13, wherein the API test automation server, for performing of the validation on the at least one of the database validation and the log validation, is further configured to:

initiate a microservice corresponding to the determined at least one of the database validation and the log validation, wherein the microservice is comprised in the at least one of the generic database validation microservice or the generic log validation microservice;

creating a new request file based on at least one of the configuration file/the plurality of testing parameters for the at least one API on test, wherein the configuration file/the plurality of testing parameters comprises one or more database validation rules for the at least one API on test that is to be validated, and wherein the validation is performed based on the created new request file.

15. The system of claim 13, wherein the validation of the at least one of the database validation or the log validation is performed based on the configuration file/plurality of testing parameters and a previous response of at least one of the database validation or the log validation related to the created requested file.

16. The system of claim 13, wherein the generic database response validation microservice, the generic database validation microservice, and the generic log validation microservice is implemented at a cloud server.

* * * * *